(12) United States Patent
Lindsay et al.

(10) Patent No.: US 7,451,335 B2
(45) Date of Patent: *Nov. 11, 2008

(54) SELECTIVELY DISABLING A PORTION OF ASF OPERATIONS WHEN ASF DEVICE IS POWERED BY AUXILIARY POWER

(75) Inventors: Steven B. Lindsay, Mission Viejo, CA (US); Andrew S. Hwang, Redondo Beach, CA (US); Andrew M. Naylor, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 1247 days.

This patent is subject to a terminal disclaimer.

(21) Appl. No.: 10/131,362

(22) Filed: Apr. 24, 2002

(65) Prior Publication Data

US 2003/0028633 A1   Feb. 6, 2003

Related U.S. Application Data

(60) Provisional application No. 60/286,320, filed on Apr. 24, 2001.

(51) Int. Cl.
*G06F 1/32* (2006.01)
(52) U.S. Cl. .......................... 713/324; 710/8; 713/340
(58) Field of Classification Search ............... 709/217, 709/221, 250; 713/340, 324; 710/8
See application file for complete search history.

(56) References Cited

U.S. PATENT DOCUMENTS 5,983,269 A    11/1999 Mattson et al.
6,021,493 A    2/2000  Cromer et al.
6,085,278 A    7/2000  Gates et al.
6,175,927 B1 * 1/2001  Cromer et al. .............. 713/300
6,266,696 B1 * 7/2001  Cromer et al. .............. 709/224
6,393,570 B1 * 5/2002  Henderson et al. .......... 713/310
6,393,589 B1 * 5/2002  Smit et al. .................... 714/55
6,513,128 B1 * 1/2003  Wang et al. ................. 713/600
6,532,497 B1 * 3/2003  Cromer et al. .............. 709/250
6,694,360 B1 * 2/2004  Duguay et al. .............. 709/220

OTHER PUBLICATIONS

Alert Standard Forum (ASF) Specification, Version 1.0c, Jan. 17, 2001.*
PCI Bus Power Management Interface Specification, Revision 1.1, Dec. 18, 1998.*
Register for and Process Alarms to Alerts, *IBM Technical Disclosure Bulletin*, Sep. 1994, vol. 37, Issue 9, pp. 339-344.
International Search Report, Aug. 21, 2002.

* cited by examiner

*Primary Examiner*—Thomas Lee
*Assistant Examiner*—Albert Wang
(74) *Attorney, Agent, or Firm*—McAndrews, Held & Malloy, Ltd.

(57) ABSTRACT

Techniques are disclosed for providing system manageability for computing systems operating under OS-absent conditions. In particular, techniques are disclosed for providing fully functional system management capabilities even when the primary power source for the computing system is disabled. One aspect of the invention provides an ASF-compliant device that selectively supports partial ASF functionality. One aspect of the invention provides an ASF-compliant device that runs ASF firmware that is stored in nonvolatile memory and can be upgraded in the field. One aspect of the invention provides an ASF-compliant device that runs ASF firmware and that can load portions of the ASF firmware into its memory in stages.

30 Claims, 8 Drawing Sheets

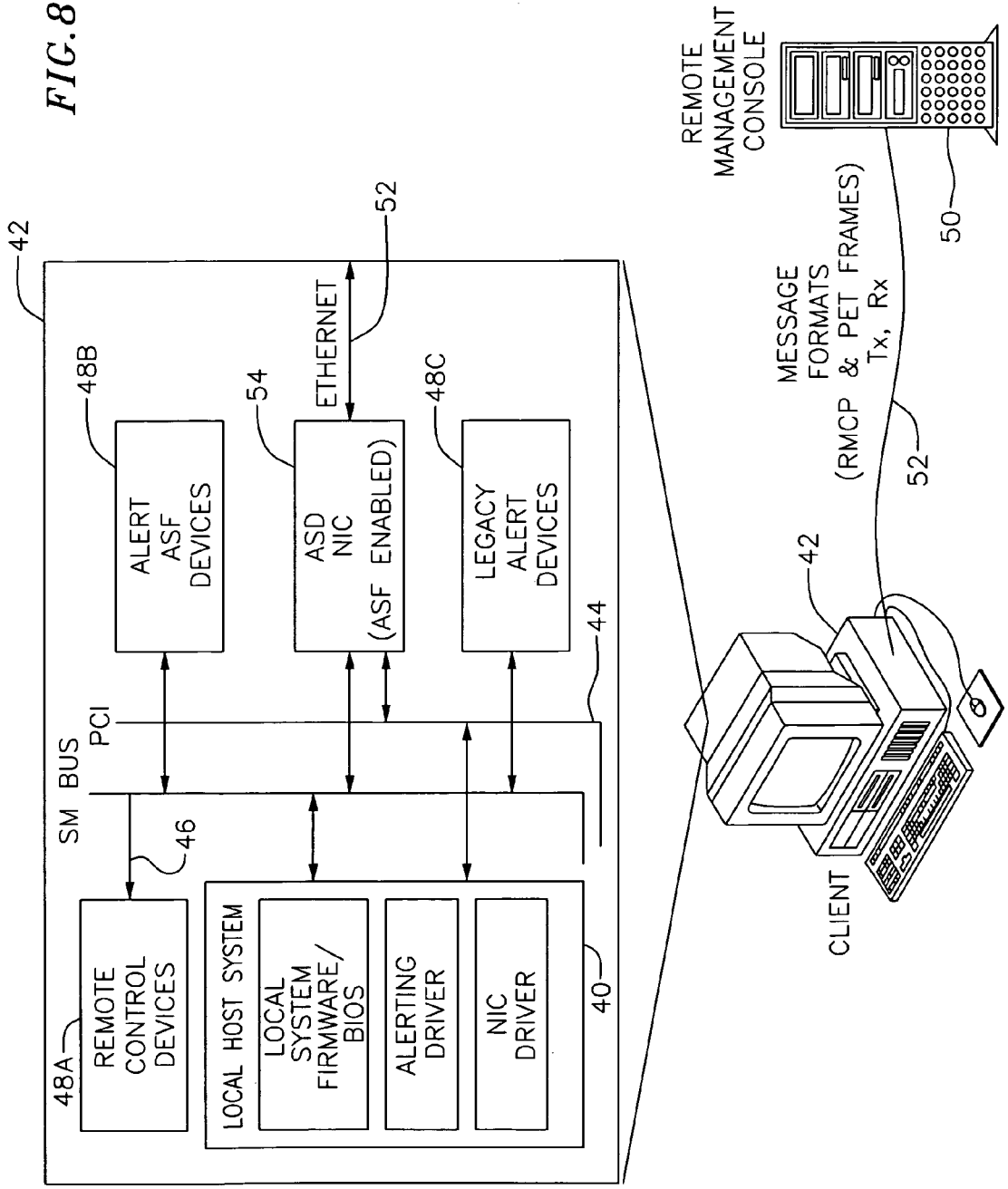

SELECTIVELY DISABLING A PORTION OF ASF OPERATIONS WHEN ASF DEVICE IS POWERED BY AUXILIARY POWER

CROSS-REFERENCE TO RELATED APPLICATION(S)

The present application claims priority on the basis of the following U.S. Provisional Patent Application, the entire contents of which is herein incorporated by reference as though set forth in full: Ser. No. 60/286,320, filed Apr. 24, 2001, and entitled "INTEGRATED GIGABIT ETHERNET PCI-X CONTROLLER." The present application also is related to co-pending U.S. patent application Ser. No. 09/865,844, filed May 25, 2001, and entitled "MULTIPROTOCOL COMPUTER BUS INTERFACE ADAPTER AND METHOD," the entire contents of which is incorporated herein by reference as though set forth in full. The present application also is related to co-pending United States Patent Application entitled "ALERTING SYSTEM, ARCHITECTURE AND CIRCUITRY," with named inventors Steven B. Lindsay, Andrew SeungHo Hwang and Andrew M. Naylor filed on Apr. 24, 2002, the entire contents of which is incorporated herein by reference as though set forth in full. The present application also is related to co-pending United States Patent Application entitled "POWER MANAGEMENT SYSTEM AND METHOD," with named inventors Steven B. Lindsay, Andrew SeungHo Hwang, Andrew M. Naylor, Scott Sterling McDonald and Habib Anthony Abouhossien filed on Apr. 24, 2002, the entire contents of which is incorporated herein by reference as though set forth in full. The present application also is related to co-pending United States Patent Application entitled "INTEGRATED GIGABIT ETHERNET PCI-X CONTROLLER," with named inventors Steven B. Lindsay, Andrew SeungHo Hwang, Andrew M. Naylor, Michael Asker, Jennifer Chaio, Myles Wakayama and Gary Alvstad filed on Apr. 24, 2002, the entire contents of which is incorporated herein by reference as though set forth in full.

BACKGROUND OF THE INVENTION

1. Field of the Invention

The present invention relates to computing systems and, more specifically, to memory loading and handling for integrated alerting and management functions.

2. Background of the Invention

To reduce the total cost of ownership of computing systems such as personal computers, a number of technologies have been developed to provide more cost effective system maintenance and to maximize system "up-time". For example, some of these technologies give IT administrators more visibility and control over remote systems. Traditionally, these technologies require that the "managed" system is an operational state with the Operating System (e.g., Microsoft Windows®) of the computing system loaded. Examples of technologies that require the operating system ("OS") to be loaded are Desktop Management Interface ("DMI") and Common Information Model ("CIM").

In general, however, technologies that require the OS to be loaded do not allow an administrator to have remote visibility or access to systems that have serious hardware or software problems that prevent the OS from loading or working correctly. In addition, these technologies do not allow for a system to be remotely managed while in a low power mode. For these scenarios, there is a need for a standardized low-level technology that gives administrators remote access to and control over the managed system.

Several vendors have developed proprietary technologies in this area. Intel and IBM created Alert on LAN (AoL) technology. AoL provided remote notification of local system states and various hardware or software failures in an OS absent environment. In addition, Intel and others developed the Platform Event Trap ("PET") format, to describe how alerts were formatted over the network.

As the number of these technologies increased, computing system vendors were faced with the possibility of having to support several different alerting standards. As a result, the Distributed Management Task Force ("DMTF") developed an open remote control and alerting standard: the Alert Standard Format ("ASF").

ASF is a specification that defines methods for alerting and remote system control. ASF is specifically targeted at OS-absent environments. As used herein, the term "OS-absent" refers to a computer system that is in a state including, without limitation, a no active OS state, an inoperable OS state, a low-power state, and/or a system-sleep state.

The remote control and alerting system defined by ASF includes a remote management console that communicates with one or more clients. Here, the term "client" refers to a managed computing system. Typically, the remote management console is located remotely from the computing systems and communicates with the clients via a network. An alert sending device ("ASD"), which is a component in each client, interfaces with other components in the computing system to respond to remote control requests from the remote management console. Such requests include, for example, power-up, power-down and maintenance requests. The ASD also interfaces with sensors in the client computing system. When a sensor detects an "alert event," the ASD in the client sends a corresponding alerting message to the remote management console. To this end, the ASF specification defines interfaces for sensors, alert sending devices (which may include, for example, network interface cards or Modems), remote management console software, and system firmware in order to allow system vendors (and system component vendors) to develop ASF compliant products.

In summary, the above technologies, collectively referred to as "system manageability" technologies, enable remote system access and control in both OS-present and OS-absent environments. These technologies are primarily focused on minimizing on-site maintenance; maximizing system availability and performance to the local user; maximizing remote visibility of (and access to) local systems by network administrators; and minimizing the system power consumption required to keep this remote connection intact.

While the ASF standard specifies protocols that may be used to address problems associated with "system manageability," the ASF standard falls short of addressing many issues involved in providing a robust remote control and alerting system implementation. Accordingly, there is a need for improvements in ASF implementation in the art.

SUMMARY OF THE INVENTION

Techniques are disclosed for providing system manageability for computing systems operating under OS-absent conditions. In particular, techniques are disclosed for providing fully functional system management capabilities even when the primary power source for the computing system is disabled.

One aspect of the invention provides an ASF-compliant device that selectively supports partial ASF functionality. For example, when running off of auxiliary power the ASF-compliant device may disable certain ASF routines. One specific example involves disabling timers associated with devices that would be powered off when primary power is off.

One aspect of the invention provides an ASF-compliant device that runs ASF firmware that is stored in nonvolatile memory and is field upgradeable. Upgrades are accomplished over system buses or other circuits, or by physically replacing the memory device. A serial interface may connect the ASF device to the nonvolatile memory.

One aspect of the invention provides an ASF-compliant device that runs ASF firmware and that can load portions of the ASF firmware into its memory in stages. For example, one portion of the ASF code may be loaded into memory, then, at a later time, another portion of the ASF code may be loaded over the first portion of the code. In one embodiment, the second portion is loaded after the first portion of code is no longer needed.

One embodiment of the invention is implemented in a network controller. The network controller includes a multiprotocol bus interface adapter coupled between a communication network and a computer bus. An alert standard format controller cooperates with the multiprotocol bus interface adapter to monitor and manage the routing of alert standard format messages between the communication network and the computer bus.

In one embodiment, the network controller is an advanced, high-performance, high-bandwidth, highly-integrated controller that integrates complex network communication, management, and support features and functions onto a single VLSI integrated circuit chip. In particular, the teachings of the invention may be implemented in an Integrated Gigabit Ethernet PCI-X Controller.

The computer bus and the multiprotocol bus interface adapter may be adapted to employ a PCI protocol, a PCI-X protocol, or both. An embodiment of the present invention may further include a management bus controller coupled with the multiprotocol bus interface adapter. The management bus controller is adapted to monitor and manage preselected components coupled with one of the communication network and the computer bus. The management bus controller is adapted to employ at least one of an Alert Standard Format (ASF) specification protocol, a System Management Bus (SMBus) specification protocol, an Intelligent Platform Management Interface (IPMI) specification protocol, and a Simple Network Management Protocol (SNMP).

In one embodiment, the network controller includes a 10/100/1000BASE-T IEEE Std. 802.3-compliant transceiver and media access controller (MAC) coupled with the communication network; a buffer memory coupled with the MAC, wherein the buffer memory includes one of a packet buffer memory, a frame buffer memory, a queue memory, or a combination thereof; and a central processing unit ("CPU") used for transmit functions and a CPU used for receive functions coupled with the multiprotocol bus interface adapter and the management bus controller. The multiprotocol computer bus interface adapter, the management bus controller, or both can include at least one of a Gigabit Media Independent Interface (GMII) interface, an 10-Gigabit Media Independent Interface (XGMII), a 10-Gigabit attachment unit interface), XSBI (10-Gigabit serial bus interface (XAUI), a Serial Gigabit Media Independent Interface(SGMII), a Reduced Gigabit Media Independent Interface (RGMII), a Reduced Ten Bit Interface (RTBI), a Ten-Bit Interface (TBI), a Serial Gigabit Media Independent Interface (SMII), and a Media Independent Interface (MII). Also, the multiprotocol bus interface adapter is suited to interface one of an IEEE Std. 802.3-like protocol, a SONET/SDH-like protocol, a Fiber-Channel-like protocol, SCSI-like protocol, and an InfiniBand-like protocol.

In certain embodiments of the present invention, the network controller can be realized in a single-chip VLSI implementation, for example, an 0.18 micron CMOS VLSI implementation, which can be particularly advantageous for application of these embodiments to Gigabit Ethernet network interface cards and LAN-on-Motherboard (LOM) systems.

BRIEF DESCRIPTION OF THE DRAWINGS

These and other features, aspects and advantages of the present invention will be more fully understood when considered with respect to the following detailed description, appended claims and accompanying drawings, wherein:

FIG. 8 is a block diagram of one embodiment of an ASF system.

DEFINITION OF TERMS

"Network Controller." A system that controls an interface to a network. A network controller may comprise, for example, any combination of hardware, firmware and/or software. A network controller may take the form of, for example, an integrated circuit, a circuit board, a motherboard, and/or a system consisting of any combination of these components.

"Network Controller Integrated Circuit." An integrated circuit that incorporates network control functions.

"Network Interface Card (NIC)." A network controller implemented on a circuit board such as an add-in adapter card or implemented as a LAN-on-motherboard solution.

"Ethernet Controller." A system that controls an interface to an Ethernet network. An Ethernet controller may comprise, for example, any combination of hardware, firmware and/or software. An Ethernet controller may take the form of, for example, an integrated circuit, a circuit board, a motherboard, and/or a system consisting of any combination of these components.

"Ethernet Controller Integrated Circuit." An integrated circuit that incorporates Ethernet network control functions.

"Ethernet Network Interface Card (ENIC)." An Ethernet controller implemented on a circuit board such as an add-in adapter card or implemented as a LAN-on-motherboard solution.

"Alert Sending Device (ASD)." A communications device that is capable of sending ASF-defined alerts. This is further defined, for example, in the DMTF's ASF specification. Examples of Alert Sending Devices include, for example, Ethernet controllers and modems.

"Alert Standard Format Controller." Logic that handles ASF-related functions. This logic may comprise one or more processors and associated firmware and/or software, e.g., a CPU. This logic may comprise one or more hardware state machines.

"Primary Power Source." A source of power that provides power under normal operating conditions.

"Auxiliary Power Source." A source of power that is auxiliary to a primary power source.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
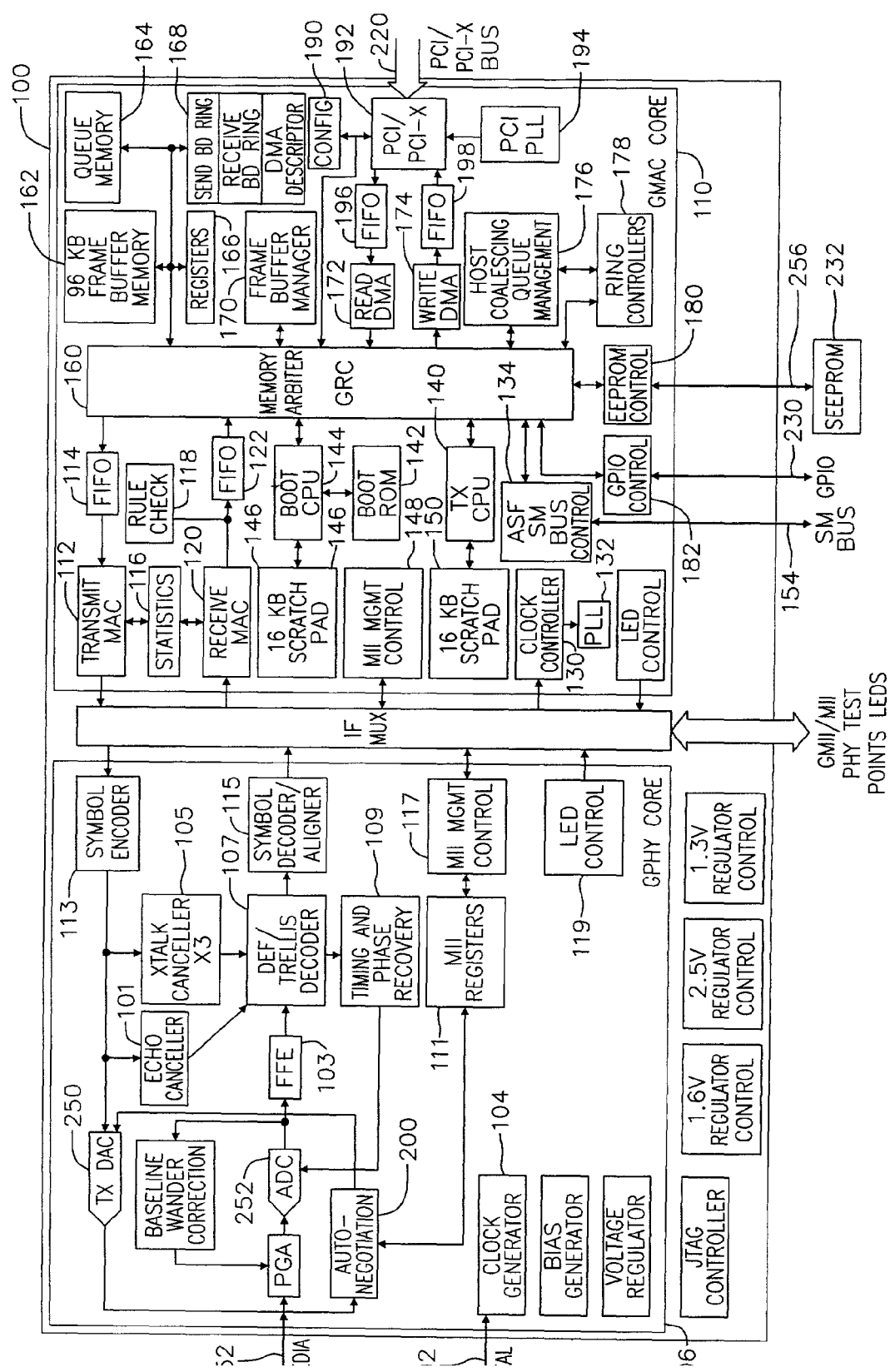
FIG. 1 is a block diagram of one embodiment of an integrated, high-bandwidth local area network controller according to the invention.

According to one aspect of the invention, an alert sending device (ASD) selectively supports partial ASF functionality. FIG. 1 illustrates a preferred embodiment of the invention where the ASF processing is performed in an embedded processing function (e.g. embedded microprocessor) that allows firmware running on the ASD to handle ASF protocols and operations. Specifically, a pair of central processing units (CPUs) 140 and 144 in an integrated circuit 100 execute ASF firmware stored in scratch pad memories 146 and 150.

In the embodiment of FIG. 1 the ASD communicates with an ASF management station (not shown) via an Ethernet network 52.

In accordance with the ASF specification, the ASD communicates with sensors (ASF and legacy) and ASD enabled devices over an SMBus 154. One example of an ASF system is depicted in FIG. 8.

In FIG. 8 a local host system 40 (e.g., a motherboard) in a client computer system 42 supports a PCI bus 44 and an SMBus 46. Unless stated otherwise, the term PCI bus as used herein refers to all versions of the PCI bus including, for example, the original PCI bus and the PCI-X bus. Devices 48A-48C connected to the busses support alerting (ASF and legacy sensor devices) and remote control operations. A remote management console 50 manages the client 42 by communicating with the ASD 54 in that computer via an Ethernet network 52. Specifically, the remote management console communicates with an ASD 54 that supports ASF and relays ASF-related messages to and from the SMBus. Thus, ASF alert messages, polling operations, and remote control operations are accomplished via communications over the SMBus and the Ethernet.

The ASF specification requires that a device perform ASF protocol processing in an OS absent environment. This includes, for example, generating and sending PET packets, interpreting and responding to RMCP messages and generating and interpreting ASF/SMBus messages.

Figure 2:
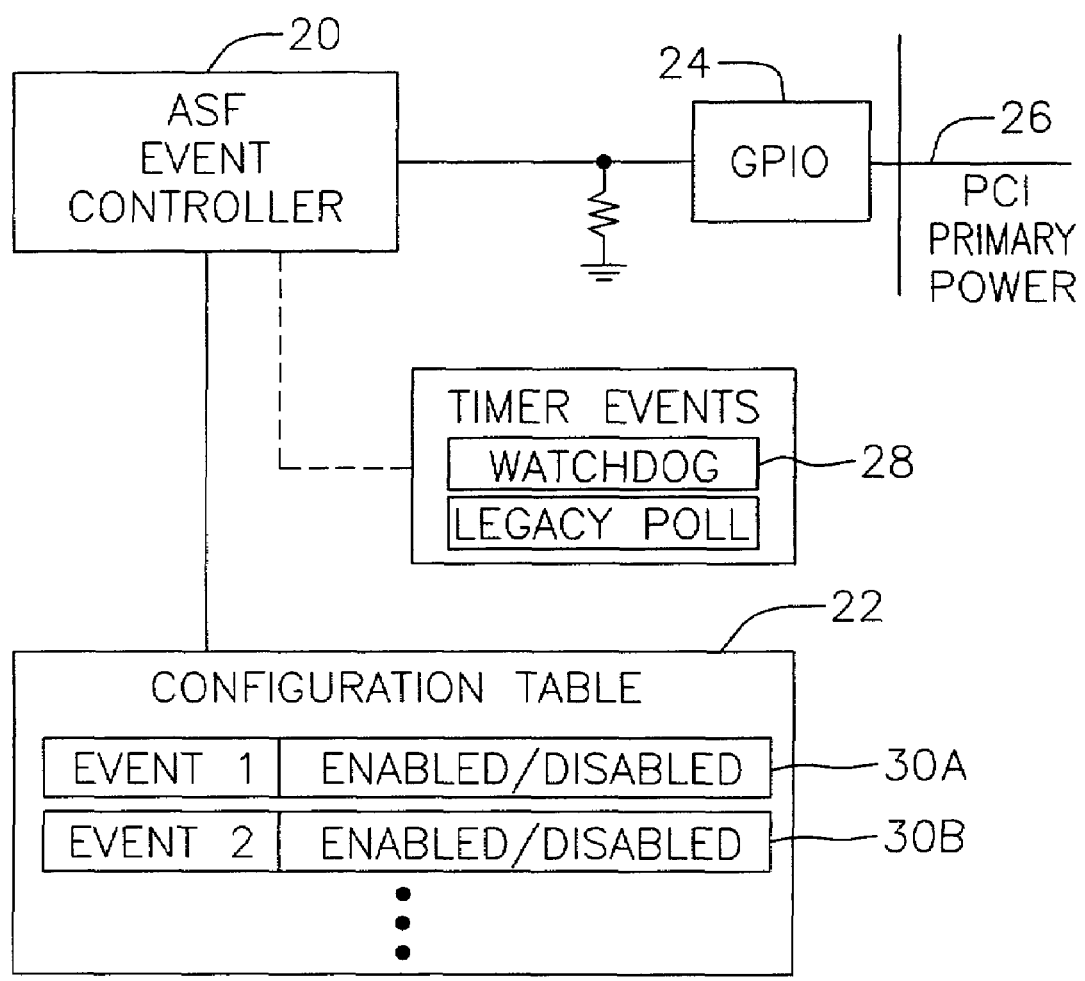
FIG. 2 is a block diagram of one embodiment of event control components according to the invention.
Figure 3:
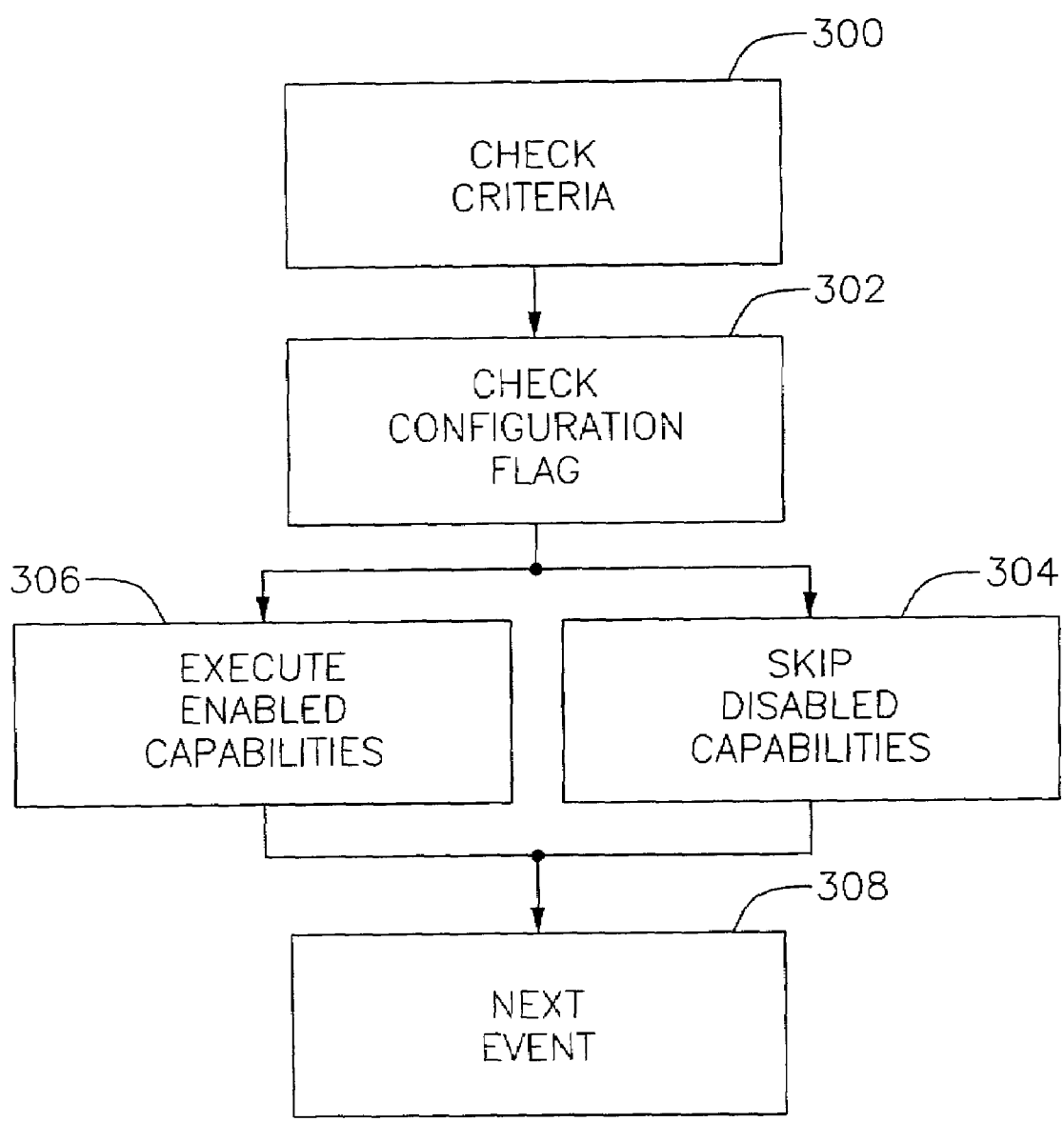
FIG. 3 is a flowchart illustrating one embodiment of partial functionality operations according to the invention.

In one embodiment, the ASD selectively supports partial ASF functionality by making run-time decisions based on one or more criteria as to whether particular ASF capabilities are to be supported. For example, FIG. 2 illustrates an embodiment where an ASF event controller 20 accesses configuration information from a configuration table 22 in an on-chip register (not shown) to determine whether associated capabilities are currently supported. This operation will be described in more detail in conjunction with FIG. 3.

Commencing at block 300, during run-time the ASD checks one or more criteria to determine whether selective execution is warranted. If so, before performing a given ASF capability the ASD checks one or more flags in the configuration table to determine whether the associated firmware code should be executed (block 302). If the capability is disabled (block 304), the ASD processes the next event in its queue (block 308). Otherwise the ASD executes the code to perform the capability (block 306), then proceeds to the next event in the queue.

In an alternative embodiment, a separate routine polls for criteria. In the event the criteria is met, the routine sets appropriate flags in a table. In this embodiment, the run-time routine discussed above merely checks the flags to determine whether a given ASF capability should be supported.

A specific embodiment of the invention will be treated in conjunction with FIG. 2. In this embodiment, the ASD is configured to perform ASF operations in an OS absent environment, in particular when auxiliary power is available.

The OS absent condition may occur in a personal computer, for example, when the primary power (5V or 3.3V) for the PCI bus is off. The PCI bus does, however, provide an auxiliary 3.3V supply, named Vaux power, that may provide power to devices connected to the PCI bus in the event primary PCI power is off. Vaux power is designed to provide limited power of 375 mA to the PCI bus devices in the event the primary supply is off.

In FIG. 2 a general purpose input-output (GPIO) port 24 is connected to the primary PCI bus power 26. The ASF event controller 20 reads this GPIO port to determine whether primary power is off. If so, the controller 20 will act to disable certain ASF functions that should not be executed in the low power mode. For example, ASF watchdog timers 28 are used to determine whether a device connected to the PCI bus is operating. If the device is operating, system BIOS in the device should continually reset the watchdog timer. In the event the device is not operating because of the loss of primary PCI bus power, it may be desirable to disable the watchdog timer. In this case the ASF event controller sets a flag 30A or 30B in the table. This flag indicates that the watchdog timer for a given device should not be run. Then, when the ASD event for this watchdog timer comes up, after reading the value of the flag, the ASF firmware will not start the watchdog timer.

ASF functionality may be selectively enabled or disabled to prevent traffic on the SM bus. This may be desirable when the systems being powered by auxiliary power and there are devices on the SM bus that are not powered by auxiliary power.

ASF functionality may be selectively enabled or disabled to prevent sensors from being polled. This may be desirable when on auxiliary power and there are sensors that are not powered by auxiliary power.

This aspect of the invention has a significant advantage over ASDs that implement ASF functionality in hardware state machines. In that case, it is more difficult to selectively enable and disable ASF capabilities. For example, pursuant to one aspect of the invention as devices are added or removed from the PCI bus, firmware ASF routines can update the configuration tables to indicate which capabilities should be enabled or disabled for those device. Such a procedure typically would be more difficult to perform using state machines.

In some embodiments, the configuration information is stored in the SEEPROM when the system is manufactured. Thus, configurations can be easily modified with every release.

Moreover, the specific functionality of the firmware can be set when the ASD is configured. For example, configuration software may be used to configure the ASF information in an EEPROM to identify which sensors are to be polled when running on auxiliary power.

Another important aspect of the invention is the use of an off-chip memory that can be upgraded in the field to store the ASF code and/or configuration information. Thus, the ASF firmware may be loaded into the non-volatile memory at manufacturing time and the ASF firmware may be modified after the ASD is shipped from the factory. In this way, problems associated with the ASF code maybe fixed and new ASF features added by simply changing the firmware.

The ASD accesses the ASF code in the SEEPROM 232 of FIG. 1 as follows. The boot CPU 144 retrieves ASF firmware from the non-volatile SEEPROM 232 via a serial bus 256 in cooperation with an EEPROM control 180. The boot CPU uploads the ASF firmware into one or more of the scratch pad data memories 146 and 150. Next, the boot CPU compares a checksum it calculated on the uploaded ASF firmware and/or configuration information with the associated checksum(s) stored in the SEEPROM. If the checksums match, execution is turned over to one or both of the CPUs 140 and 144 to execute the ASF firmware from the scratch pads 146 and/or 150 to perform the ASF operations.

Figure 4:
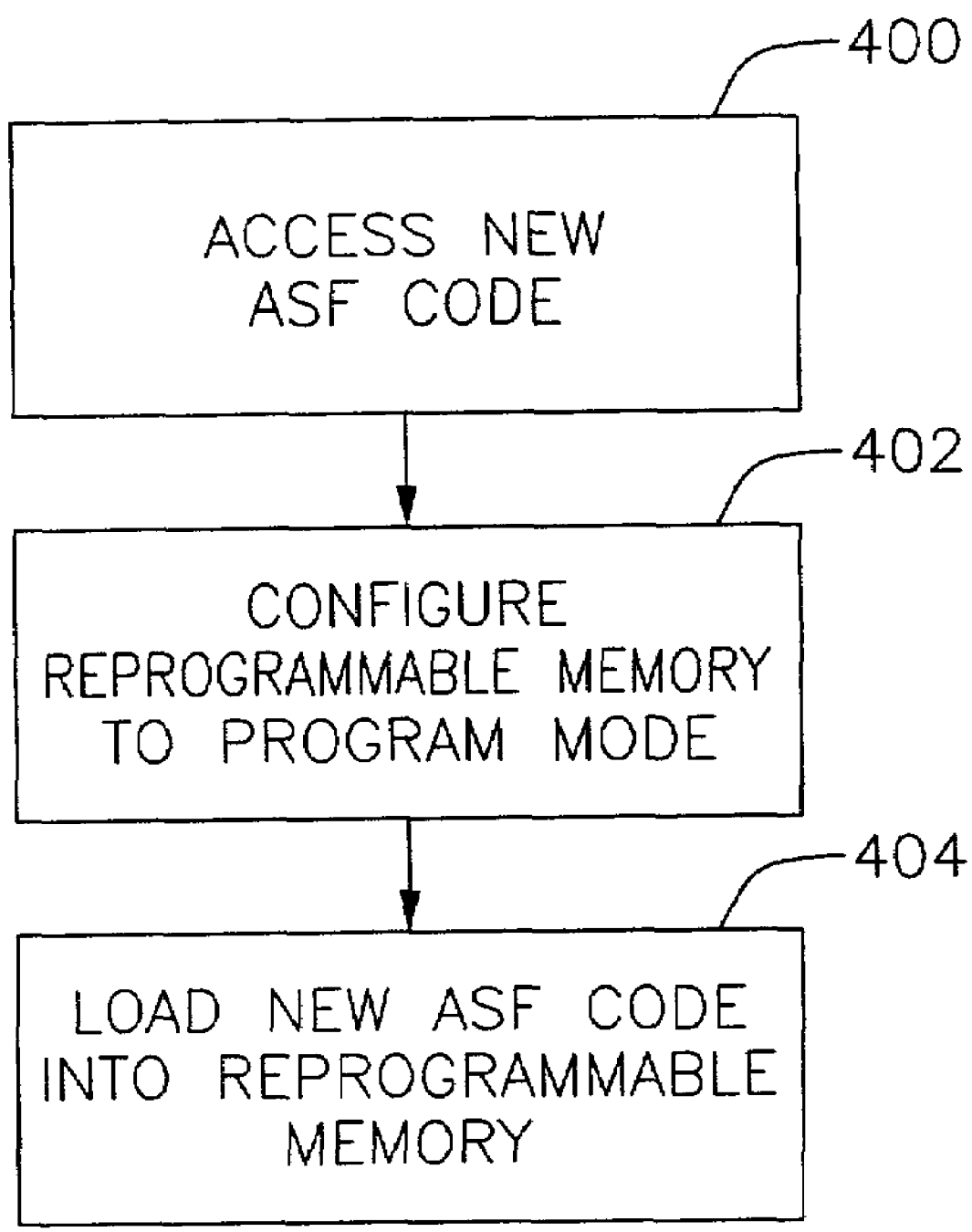
FIG. 4 is a flowchart illustrating one embodiment of data memory upgrade operations according to the invention.

A typical field upgrade routine is described by FIG. 4. First, an upgrade program accesses the new ASF code as represented by block 400. Then, the program communicates with the SEEPROM via the EEPROM control to configure the SEEPROM for reprogramming (block 402). Next, the program sends the new code to the SEEPROM via the ASD (block 404) to program the SEEPROM.

In one embodiment, the ASF firmware is upgraded by a software utility running on the host. In this way, the new code may be transferred to the nonvolatile memory over the PCI bus. In an alternate embodiment, the firmware is upgraded from a remote location that accesses the ASD via a network interface for the ASD. Also, the firmware may be upgraded via a dedicated bus on the ASD.

Thus, a system constructed according to this aspect of the invention can be easily upgraded to, for example, support new devices and new ASF standards. This is made possible, in part, by the architecture of the disclosed embodiment that provides a CPU that can perform a wide variety of tasks.

Moreover, the disclosed architecture enables the CPU to interface with all of the data paths, thereby providing extreme flexibility in the type and number of ASF functions that may be added to the ASF code.

Another aspect of the invention relates to an ASD that runs ASF firmware and that can load portions of the ASF firmware into its memory in stages. As described in FIG. 5 the ASF code includes ASF initialization code 981 along with the ASF run-time code and data. The initialization code is not needed after it is executed. Thus, to save space in the scratch pad, in accordance with one embodiment of the invention, the initialization code is effectively discarded once it is executed. Thus, all of the scratch pad is available to store the ASF run-time code when it is loaded into the scratch pad. In one embodiment, the initialization code is not actually discarded. Rather, the run-time code is merely loaded so it rewrites the data at the address locations where the initialization code was stored.

Figure 6:
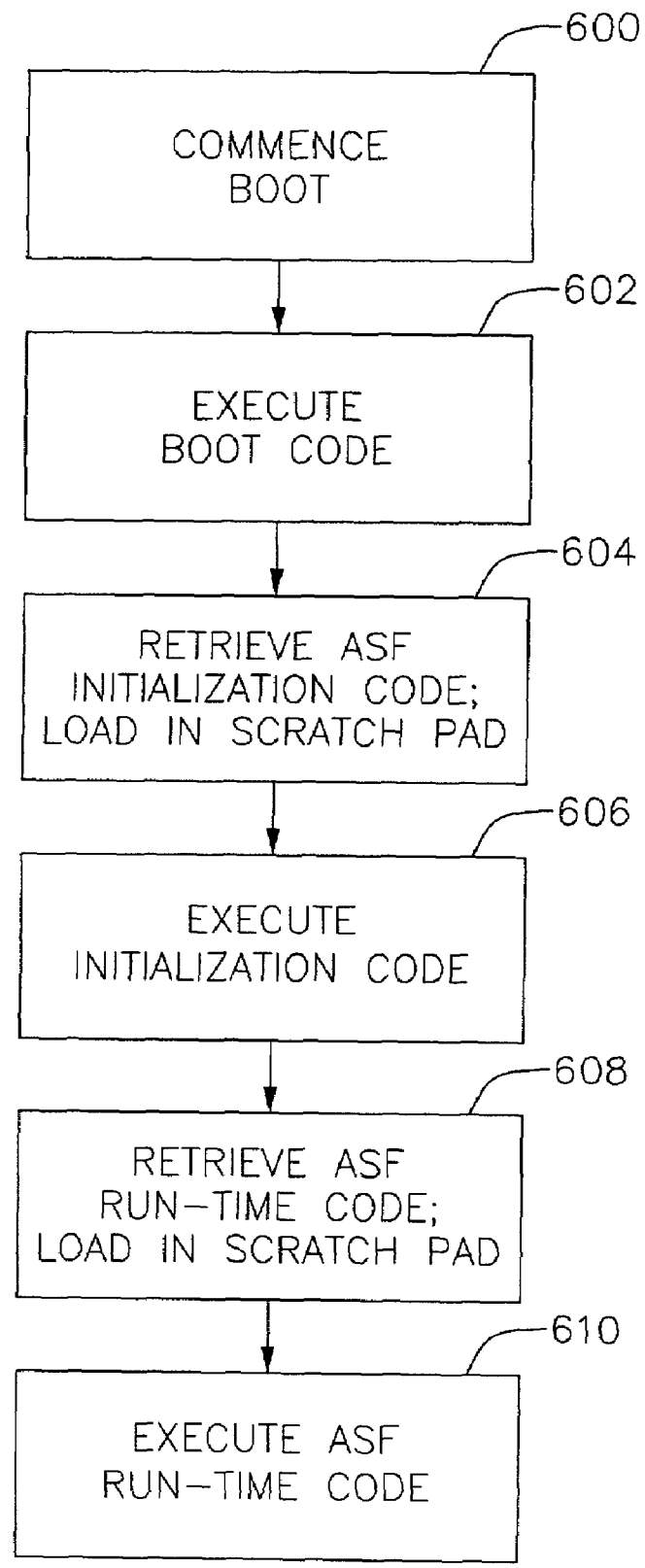
FIG. 6 is a flowchart illustrating one embodiment of boot operations according to the invention.

One embodiment of this procedure is described in FIG. 6. Commencing at block 600, the boot operation begins with either a hard or soft reset. At block 602, the boot CPU 144 boots up using code stored in the nonvolatile boot ROM 142. As represented by block 604, the boot CPU retrieves the ASF initialization code from the nonvolatile SEEPROM via a serial bus 256 in cooperation with an EEPROM control 180 and loads it into one or more of the scratch pad data memories 146 and 150. Next, the boot CPU compares a checksum it calculated on the uploaded initialization code and/or configuration information with the associated checksum(s) stored in the SEEPROM. If the checksums match, the boot CPU then executes the initialization code to set up the registers and perform other initialization tasks (block 606). After the initialization tasks are complete, the boot CPU retrieves the ASF run-time code for the two CPUs 140 and 144 from the non-volatile SEEPROM and loads the ASF firmware into one or more of the scratch pad data memories 146 and 150 (block 608). The boot CPU then compares a checksum it calculated on the uploaded ASF firmware and/or configuration information with the associated checksum(s) stored in the SEEPROM. If the checksums match, one or both of the CPUs 140 and 144 execute the ASF firmware from the scratch pads 146 and/or 150 to perform the ASF operations (block 610).

Referring again to FIG. 1, a preferred embodiment is a network controller chip for a PCI bus. In the embodiment of FIG. 1, the invention implements an advanced, high-performance, high-bandwidth, highly-integrated controller, such as an Integrated Gigabit Ethernet PCI-X Controller 100, that integrates complex network communication, management, and support features and functions onto a single VLSI integrated circuit chip. Embodiments of the invention can be configured as a network controller, which is coupled between a communication network and a computer bus, and which incorporates a multiprotocol bus interface adapter and an alert supervisory bus controller.

In the embodiment of FIG. 1, each ASF controller contains 2 on-chip MIPs R4000 processor cores 140 and 144. Each MIPs processor has a dedicated 16 KB data memory, scratch pads 146 and 150, that can be used to store code and data that is used by the on-chip processor. Each processor can execute code out of its local scratch pad or out of the other processor's scratch pad, or out of the controller's packet buffer memory (e.g., 96 KB). However, fastest code execution is achieved when firmware for a given processor is running out of that processor's scratch pad memory. As discussed above, the processors are capable of bootstrapping themselves via code stored in the attached EEPROM.

In this embodiment, hardware components provide the network interface, the raw SMBus interface, the SEEPROM interface, various timers, memory, and registers that are used by the firmware.

As discussed above, the ASF firmware may be stored off of the chip in a serial electrically-erasable programable read-only memory (SEEPROM). The SEEPROM stores the ASF firmware executable code, data structures used by the executable code (e.g., configuration information). These data structures include system state information, sensor characteristics and other information.

Figure 5:
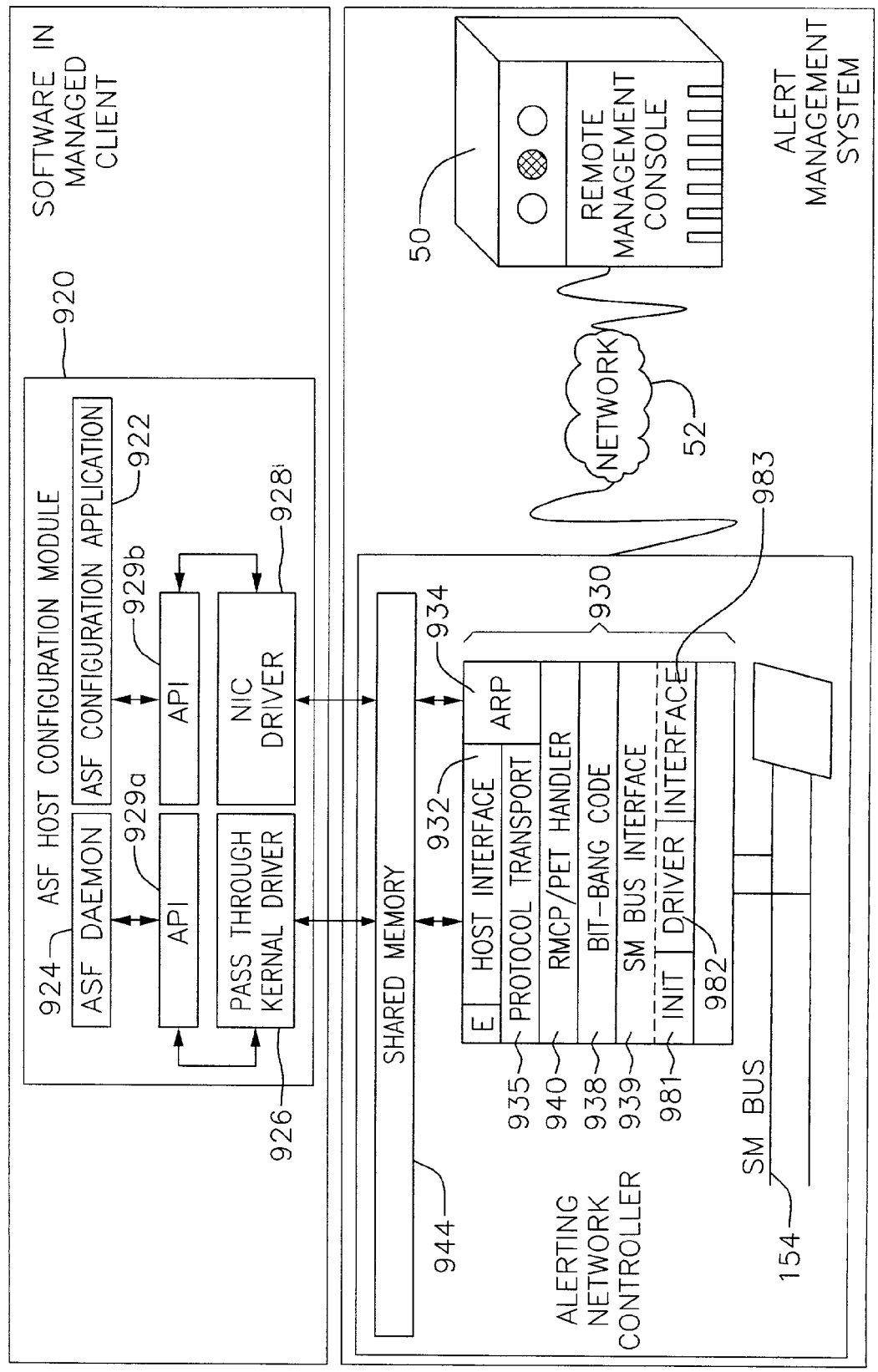
FIG. 5 is a block diagram of one embodiment of an alerting network controller in the context of an alert management system.

Typically the configuration information is provided by a configuration utility 922 as represented in FIG. 5. For example, the configuration utility may retrieve alerting and RMCP information from system firmware along with other configuration information from the end user, and stores this information in the SEEPROM of the ASD.

As represented by the ASD firmware block 930 in FIG. 5, the ASF firmware executable code (represented, for example by blocks 932, 934, 935, 938, 939, 940, 981, 982 and 983) provides the intelligence that controls both the alerting and RMCP operations. This includes driving the Ethernet interface, formatting alerts, parsing incoming RMCP packets, and taking the appropriate action based on the contents of the remote control message. ASF Firmware also contains a subset of code that acts as a SMBus driver that manipulates the SMBus interface. The SMBus interface is used by the ASF capable ASD to interface with other ASF system components such as sensors.

In one embodiment the EEPROM can store up to 32 kbytes of data. It should be appreciated by one skilled in the art that other forms of non-volatile memory such as FLASH memory may be used in accordance with the invention.

Further to above, one embodiment of the operation of the firmware in conjunction with the hardware will be discussed in detail.

Alerting

Alerting is a term used to describe the notification of a network management function of the status of a remote unit. An ASF enabled ASD sends "alert" message over a network. These alert messages may take the form, for example, of a Platform Even Trap (PET). A PET may be generated when a "sensor" indicates that is has detected an "alert event". An example sensor device would be an ASIC (Application Specific Integrated Circuit) that provides thermal sensors, voltage sensors, chassis intrusion detection, etc. These sensors may communicate event information to the ASD via an SMBus. The ASD may then build a PET packet based upon the event information and transmit the PET packet to a management station on the network.

A PET may also be generated by the expiration of timers, such as for example, a watchdog or heartbeat timer. The ASD itself may be managing the heartbeat timer. If the timer expires the ASD may generate a PET.

Remote Management and Control

An ASF enabled ASD needs to support the Remote Management and Control Protocol (RMCP). RMCP is a UDP (User Datagram based protocol), and is used for client control functions when a managed client is in an "OS absent" state. RMCP provides a way for a management console to remotely control and manage an ASF enabled client. Common control functions include operations such as system reset, system power-up, system power-down, etc.

The ASD commonly operates in a RMCP environment. Typically the ASD will parse incoming RMCP packets, and then take the appropriate action. For remote control commands (e.g. reset), the ASD parses the RMCP packet and then passes the resultant command, via the SMBus (System Management Bus), to the appropriate device in the system. For other RMCP management operations (e.g. a presence ping), the ASD will generate an RMCP response packet that contains the appropriate management information.

ASF ASD Design

The ASF code running on processors 140 and 144 can intercept or inject data at various points with the device, and control all registers and functions in the device. The internal processors can interface with various functional blocks within the chip through the use of internal queue structures and these queue structures allow the processors to intercept or inject data into either the incoming or outgoing data stream. By using an on-board processor to run firmware that provides the "brains" behind the alerting and remote control functions, flexibility is achieved and OEM specific extensions and problems may be solved via firmware changes. Firmware may be upgraded in the field.

Data packets may enter the circuit 100 from the media 52, e.g., an Internet connection. The packets then pass through the PHY (Physical Layer Interconnection) 106 and are accepted into the receive MAC (Media Access Controller) 120. The rules checker 118 then examines the packets. The rules checker is a pattern matching circuit, which compares the bytes of an incoming packet vs. the bytes of one or more filter patterns programmed by firmware or software. Furthermore the rules checker has a byte masking capability so that only specific bytes in the incoming packet are compared to the programmed patterns. Therefore the rules checker 118 can be used to identify packets belonging to certain protocols e.g. ARP or RMCP packets. The rules checker 118 places ASF packets in a memory FIFO 122 from where they are provided to ASF circuitry, e.g., component 134.

ASD Hardware

As discussed earlier, most of the intelligence in the illustrated ASF ASD solution resides in ASD firmware rather than in dedicated ASD hardware. This allows a degree of flexibility and freedom when changes need to be made to the ASD's ASF support. However, in order to assist ASD firmware in handling alerts and RMCP traffic, the underlying controller hardware has supplemental hooks and capabilities: i.e., 2 MIPs processors 140 and 144 with associated scratchpad memory 150 and 146; a rules-checker 118 for flexible ASF packet parsing; SMBus 2.0 Compliant interface 134; ASF related Timers; SEEPROM interface 180 for non-volatile storage of ASF related information; and Vaux (Auxiliary power) support.

To allow firmware visibility and control of incoming packets the circuit 100 hardware allows the firmware running on the processors 140 and 144 to intercept, parse, and filter incoming packets. Packets enter the circuitry 100 via a connection to an external media, 52, such as an Ethernet cable. The circuit 100 hardware allows the firmware running on the processors 140 and 144 to inject transmit packets into an outgoing packet stream. Basically, the firmware has visibility and control over the data path, which helps the processors 140 and 144 to implement ASF protocol functions.

The circuitry 100 is equipped with a special state-machine called the "rules-checker" 118 that allows the application of a byte mask of up to 16 "rules" (i.e., patterns) against incoming packets. This pattern matching capability can be used by ASD firmware, which is run on processors 140 or 144 to parse incoming ASF packets (RMCP and ARP packets), and separate them from the rest of the packet data stream. This allows the processors 140 and 144 to be called on to service ASF related packets rather than having to inspect all received packets. This means that in an "OS present" environment, ASD ASF firmware may use the rules-checker to identify ASF related packets without interfering with, or slowing down, the non ASF packet steam. This is useful because if the internal processors had to inspect every single incoming packet, the internal processors would not be able to keep with full rate gigabit traffic.

SMBus Compliant 2.0 Interface

In the embodiment illustrated in FIG. 1 the firmware can control the SMBus interface through two mechanisms. The first mechanism allows firmware to directly control the SMBus pins. When using this mode, firmware incorporates a "SMBus driver" that can manually manipulate ("bit-bang") the SMBus signals. Since SMBus operates so much slower than the on-chip processors, this method may be sufficient although somewhat cumbersome. Another mechanism, however, may provide the firmware with a higher-level (lower overhead) SMBus logical interface. The hardware firmware interface includes an SMBus FIFO and allows the hardware and firmware to pass bytes that traverse the SMBus. The hardware has the capability to generate and detect SMBus "start" and "stop" commands. SMBus PEC (Parity Check Code) is computed by hardware. The hardware supports the full range of allowed SMBus clock frequencies and clock stretching.

Timers

An ASF ASD must keep track of a number of timers. In the embodiment illustrated in FIG. 1, these timers are supported in hardware. The ASF timers comprise a watchdog timer, a heartbeat timer, a retransmission timer; an ASF polling interval timer, and a timestamp counter. All of the timers count down (or up), and are implemented in hardware. These timers could be also be implemented software, since a single software counting function can accommodate multiple timers. In the present embodiment however the timers are implemented in hardware. The timers may be loaded by processor 140 or 144. Once the timers count to a predetermined value, such as 0, they can generate an indication, such as a digital value, indicating that the count has expired. Such an indication can be provided to a register, such as 166, which can then be read by processor 140 or 144 at a convenient time, such as during an idle loop. By placing the timers in hardware the software is unburdened from the timing function and the reading of the timers to see if they have expired can be placed where they will not burden the processing, such as within a processor(s) idle loop.

Storage for ASF Related Data Structures

To assist the firmware in supporting alerting and RMCP, the ASD hardware provides storage for a number of ASF related data structures. Both volatile and non-volatile storage may be utilized. Non-volatile storage may be used for configuration information that must be permanently saved by the ASD's SW configuration utility. This configuration utility runs during the "one good boot" that is specified by the ASF specification, and is used to configure the ASD's ASF capabilities. In the present embodiment, the SEEPROM 300 is able to store 32 KB of ASF related content (mostly ASF firmware code).

ASD Firmware

ASD Firmware provides the intelligence that controls both the alerting and RMCP operations. This includes driving, for example, an Ethernet interface 52, formatting alerts, parsing incoming RMCP packets, and taking the appropriate action based on the contents of the remote control message. ASD Firmware also contains a subset of code that acts as a SMBus driver that manipulates the SMBus interface. The SMBus interface is used by the ASF capable ASD to interface with other ASF system components such as sensors.

A benefit of supporting ASF primarily in firmware as opposed to hard-coded logic in silicon is that the firmware-based approach is extremely flexible. With a simple firmware update, the circuitry 100 can support additional OEM specific management capabilities.

ASF SMBus Messages

System firmware supports the ASF SMBus messages defined in section 5 of the ASF spec. Firmware may also be developed to support future ASF messages, or customer specific messages. For example, a customer could define a new ASF SMBus message that allows for a system micro-controller to command an ASF ASD to send a generic packet (as opposed to a PET packet) via SMBus. The packet data for this generic packet could be encapsulated in an OEM specific SMBus message. To support this type of customer specific message, firmware may be developed to parse and handle these new types of SMBus messages.

SMBus ARP

One of the new features of the SMBus 2.0 protocol is the concept of a Unique Device Identifier (UDID). The UDID is used as part of SMBus Address Resolution Protocol (ARP). SMBus ARP should not be confused with Network ARP. Conceptually, both ARP protocols perform a similar function, but for entirely different media interfaces.

NIC firmware (i.e. firmware that runs on CPUs 140 and 144) allows the SMBus ARP protocol to assign the ASF ASD its SMBus address. This is a requirement for NIC add in cards. A dynamically assigned SMBus address will remain for the duration that power (including Vaux) is supplied to the ASD or until the ASD is reset. Alternatively, for LAN on motherboard (LOM) implementations, a fixed SMBus address could be used.

ASF ASD firmware may use the SMBus ARP protocol to get the SMBus address for ASF sensors that do not have a fixed address (ASD configuration software should have already retrieved and stored the SMBus address for fixed ASF sensors and legacy (non-ASF) sensors). ASF ASD firmware accomplishes this by polling the SMBus address space (using the Directed Get UDID command) looking for ASF sensors. The firmware then records the address of any ASF sensors. Later, the ASF firmware polls these sensors for alerts at a regular interval.

ASD Firmware Detection of Alerts

NIC firmware gathers alerting information via the SMBus. This information may be extracted via polling legacy sensors, or ASF sensors. Alternatively, ASF sensors can push alerts to the ASD. Once the ASD firmware detects that it needs to send an alert, it formats a Platform Event Trap (PET). Formatting the PET packet is not trivial. It requires the ASD to take the alert event information from the sensor, and then build an SNMP message, and then apply ASN.1 BER (bit encoding rules) to the SNMP message to construct an Ethernet packet. In this example, all of this is done by NIC firmware. After sending the PET, the firmware controls the retransmissions of the PET message.

Polling Legacy Devices

The firmware periodically polls each legacy sensor that is listed in an ASF_ALRT data structure described in the ASF spec. This data structure will have been extracted from system firmware by ASD configuration software and stored in the ASD's SEEPROM 232. This structure contains information about each legacy sensor including its address on the SMBus, and information about the alert events that it could signal. The firmware polls these legacy sensors using a SMBus read byte protocol. The firmware records the current state of the sensor, compares against past results and a mask, and determines if a PET needs to be sent. This process is described in the ASF spec. The frequency that legacy sensors are polled is programmable.

Polling ASF Devices

The firmware also periodically polls ASF sensors. before regularly polling ASF sensors, firmware attempts to discover ASF sensors by using the ARP (Address Resolution Protocol) to discover ASF sensors and then uses the SMBus Device Type Poll message to discover whether an ASF device is a sensor capable of handling poll alert messages. The firmware then stores the addresses of the sensors that it discovered. This discovery process needs to occur every time the system is powered-up. The firmware adds to the list of discovered sensors any fixed address undiscoverable sensors that configuration software would have found and listed in the SEEPROM 232.

Once ASD firmware has a complete list of ASF sensor address, the ASD firmware generates a SMBus Get Event Status message to each sensor to determine if a sensor has registered an alert event. If a sensor does have a new alert event, then ASD firmware uses the SMBus Get Event Data message to retrieve the specific data that pertains to the new event.

The frequency in which ASF sensors are polled is determined by the Minimum ASF Sensor Inter-Poll Wait Time value in the ASF_INFO structure.

Respond to Push Alerts

It is also possible for ASF sensors, or system firmware, to detect an alert event and to push that alert event to the ASD (rather than having the ASD poll for the event). This can be accomplished via the SMBus General Push Alert message. These messages are variable in length and contain the event data that goes into the PET. BCM570X firmware properly responds to these "push alert" messages.

Push messages can direct the ASD to send a PET with or without retransmission.

Handling Watchdog Events

System BIOS can command the ASD to start or stop a watchdog timer via the SMBus messages Start Watchdog Timer and Stop Watchdog Timer. If NIC the firmware receives a start watchdog message while it already has a watchdog timer running, it reinitializes the watchdog timer that is kept in hardware. If the hardware watchdog timer expires, an event is generated and ASD firmware is notified. The ASD firmware then generates a PET message.

ASD Firmware Generation and Formation of PET Packets

In an ASF system, there may be multiple components that can detect various "Platform Events" and signal to the ASD to send an alert to a remote management console. A platform event is defined as an event that is originated directly from platform firmware (BIOS) or platform hardware (ASIC, chip set, or micro-controller) independently of the state of the operating system. Examples of components that could originate a "Platform Event" include (but are not limited to): the host system BIOS (for example the BIOS in a host personal computer; voltage, temperature, or chassis intrusion sensors; a system management micro-controller; OS Bootstrap loader or ASD watchdog timer (e.g. 208) expiration.

There are a number of different ways that the ASD can be notified that it needs to send an alert over the network. Commonly this notification may occur over the SMBus, for example, via the following mechanisms: from the ASD polling a legacy sensor; from the ASD polling an ASF sensor; from the ASD receiving a push alert from an SMBus device (e.g. sensor or BIOS). The alerting device may then extract the event data from the event source, and format a Platform Event Trap (PET) message that will be sent out over the network.

PET High-level Format

Once the firmware has determined that a PET needs to be sent, firmware may build and transmit the PET packet. In order to do this; the firmware will have to gather information that came from multiple sources (e.g. SEEPROM 232, SMBus messages, etc.).

PET messages are formatted as SNMP (Simple Network Management Protocol) trap frames. SNMP and PET are commonly considered to be media independent. Therefore, depending on the medium, the associated header fields will be different. However, SNMP is usually layered over UDP/IP.

When the firmware formats a PET, it will construct a packet that has an Ethernet header, IPv4 header, and UDP header in front of the SNMP PET data.

PET Headers

If alerting is supported, the configuration application will for example store the necessary information in the SEEPROM 232 so that the firmware can generate a PET with the correct Ethernet header, IP header, and UDP header. Many of the fields in these headers will be fixed (e.g. IP protocol=UDP), but some fields are computed on a per PET packet basis. For instance, the UDP checksum is computed on a per PET packet basis, because the UDP data will change from packet to packet.

Parsing RMCP Packets

In the exemplary ASF environment illustrated in FIG. 1, an ASF enabled managed client might receive RMCP packets when the client is in an "OS absent" or "pre-boot state". The ASF-client's ASD will have to parse these incoming packets and take the appropriate action.

RMCP Acknowledgements

When a station receives an RMCP packet, it may generate an acknowledgement. The firmware generates acknowledgements when appropriate. The acknowledgement indicates that the RMCP packet was received.

Handling Remote Control Packets

The management server may send messages to cause an ASF enabled managed client to perform a hard-reset, power up, power-down, or power cycle reset. The reset, power up, and power cycle message types can optionally include Boot Options in its variable data.

Passing the Remote Control Command to System Control Devices

After receiving and parsing a RMCP remote control packet, the firmware directs the control message to the corresponding control device on the SMBus. Several types of control messages and responses may occur, for example RMCP Request Response packets. An RMCP control message may allow for three different request-response pairs: presence ping—presence pong; system state request—system state response, RMCP capabilities request—RMCP capabilities response.

With each of these request-response pairs, the ASF remote console will request information from the ASF managed client and the ASD in the ASF managed client will generate the appropriate response.

Handling Presence Ping Requests

An ASF-aware remote console may send a presence ping RMCP message to the managed client to request a client to respond with a presence pong message. Presence pong packets respond with data defined in the ASF spec. The firmware constructs this response data based on capability information that was stored in the ASD EEPROM by ASD configuration software.

Handling RMCP System State Request

An ASF-aware remote console may send a system state request RMCP message to the managed client to request a system state response message. The firmware constructs a response based on the system state information that it last received from the SMBus message Set System State. It is the responsibility of system BIOS to pass this SMBus message to the ASD immediately after each system reset. The ASD then stores this information in its internal memory. If the ASD has not received a Set System State since the last system reset, then it responds to this RMCP message with an "unknown" state.

Handling RMCP Capabilities Request

An ASF-aware remote console, for example the server 111 of FIG. 1A may send a capability request RMCP message to the managed client to request a client to respond with a capability response message. The firmware constructs a response based on capabilities information that is stored in the ASD's SEEPROM 232.

Network ARP Support

Address Resolution Protocol (ARP) is commonly used by end stations and routers to associate an Ethernet MAC (Media Access Controller) address with an IP address. Systems and routers will normally have an ARP cache that will expire after a period of time. If a router is supposed to forward a packet to a specific IP address, but it doesn't have an entry for that IP address in its ARP cache, then it will generate an ARP request to get the Ethernet MAC address that is associated with the IP address in question.

In order for the RMCP protocol to function in an OS-absent state, the alert-sending device must be capable of responding to network Address Resolution Protocol (ARP) requests from the local router. If the alert sending device was not capable of responding to ARPs on its own, then a router may not be able to forward an RMCP packet to the ASF enabled station because the router would not know the end stations Ethernet MAC address. Accordingly the firmware has the intelligence to detect network ARP requests and automatically generate an ARP response without any intervention from host based system software. In such a case the firmware is aware of what the IP address and the MAC address are for the ASD (firmware will have access to this information because it is stored in the ASDs SEEPROM 232).

In "OS present" situations, the NIC firmware does not automatically respond to ARP requests, rather the ARP request is handled by a standard network stack that is part of the network operating system. This allows the OS network stack to update its own ARP cache entries. The NIC firmware and the NIC device driver which functions only when the OS is present have a simple handshake mechanism that allows the NIC firmware to know when the OS is "present".

Wake-up Considerations for RMCP Traffic

Operating Systems (e.g. Windows) may require that a ASD wake-up the system upon receiving a packet that matches a prescribed packet filter. One of the commonly used wake-up packet filters is for ARPs. Another is for directed IP packets (which includes RMCP packets). The NIC firmware has an optional capability that allows users to disable wake-up on ARP and wake-up on RMCP reception.

As discussed above, in a preferred embodiment of the invention, the ASF controller that performs ASF processing comprises an embedded processing function (e.g. embedded microprocessor) that allows firmware running on the ASD to handle ASF protocols and operations. However, in another embodiment, some or all of the ASF processing may be performed by dedicated hardware state machines. Hence, in accordance with the invention, a controller that supports ASF may consist of a variety of data processing components and techniques including, for example, a CPU with associated memory, firmware and support devices, or hardware state machines and supporting circuits, or any combination of these.

Figure 7:
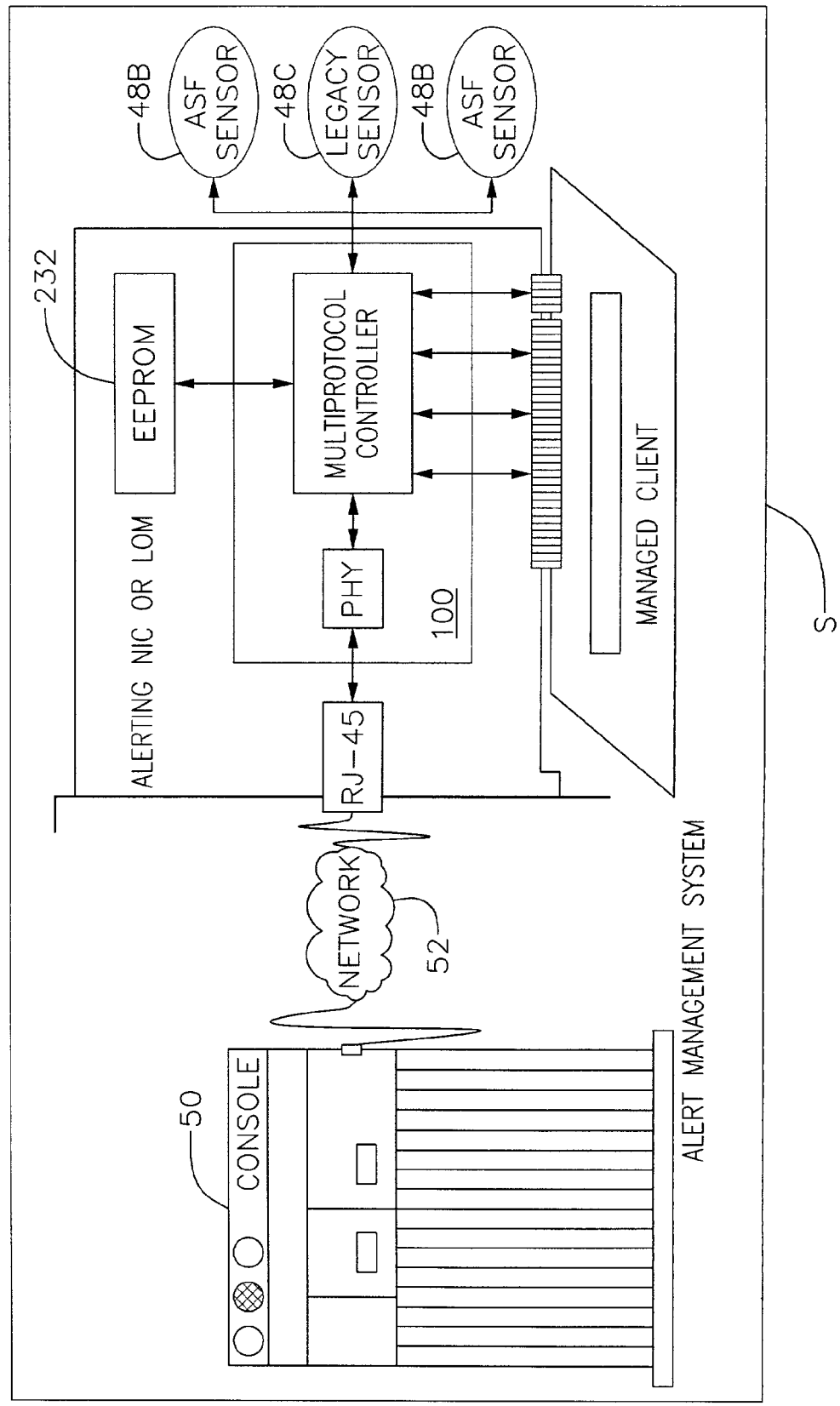
FIG. 7 is a block diagram of one embodiment of an alert management system having a multiprotocol controller according to the present invention.

Referring to FIG. 7, another embodiment of the invention is described. In FIG. 7, an embodiment of the invention is incorporated into alerting network interface card (NIC) or LAN-on-motherboard implementations. The term NIC is defined here to denote any network controller board including, for example, an add-in adapter card or a LAN-on-motherboard solution.

It will be apparent to the skilled practitioner that the invention can be employed in a variety of electronic components and in applications other than computer bus interface adapters, and it is intended that the scope of the present invention include such applications. For example, within the domain of IEEE Std. 802.3-related network adapters, the invention can be employed advantageously in a myriad of interfaces including, without limitation, XGMII (10-Gigabit Media Independent Interface), XAUI (10-Gigabit attachment unit interface), XSBI (10-Gigabit serial bus interface), SGMII (Serial Gigabit Media Independent Interface), RGMII (Reduced Gigabit Media Independent Interface), RTBI (Reduced Ten Bit Interface), GMII (Gigabit Media Independent Interface), as well as in TBI, SMII, and MII interfaces. IEEE Std. 802.3, 2000 Edition, *CSMA/CD Access Method and Physical Layer Specifications*, relevant to such implementations, is hereby incorporated herein in its entirety.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. An alert sending device, comprising:
   at least one sensor for providing a signal indicative of whether at least a portion of the alert sending device is powered by an auxiliary power source; and
   at least one alert standard format controller for performing alert standard format operations, the at least one alert standard format controller configured to generate, in accordance with the signal, at least one indication indicative of whether a portion of the alert standard format operations are enabled or disabled, and configured to selectively execute a portion of the alert standard format operations based on the at least one indication.

2. The alert sending device, of claim 1 wherein the at least one alert standard format controller only calls subroutines associated with enabled alert standard format operations.

3. The alert sending device of claim 1, wherein the at least one indication comprises at least one configuration flag that identifies which portion of the alert standard format operations is executed.

4. The alert sending device of claim 3, wherein a first routine polls for criteria to generate the at least one indication and a run-time routine checks the at least one configuration flag.

5. The alert sending device of claim 1, wherein the alert standard format operations include watchdog alerts and the at least one alert standard format controller does not perform watchdog alert operations when the alert sending device is operating on auxiliary power.

6. The alert sending device of claim 1, wherein the at least one alert standard format controller is incorporated in a network controller integrated circuit.

7. The alert sending device of claim 1, wherein the at least alert standard format controller is incorporated in a network interface card.

8. The alert sending device of claim 1, wherein a disabled alert standard format operation is associated with a timer that is associated with a device that is powered off when a primary power source is off.

9. A method of performing alert standard format operations comprising:
receiving a signal indicative of whether at least a portion of an alert sending device is powered by an auxiliary power source;
generating, in accordance with the signal, at least one indication indicative of whether alert standard format operations to be performed by the alert sending device are enabled or disabled;
identifying enabled portions of the alert standard format operations according to the at least one indication; and
executing code associated with the enabled portions of the alert standard format operations.

10. The method of claim 9, comprising using configuration information to identify the enabled portions of the alert standard format operations.

11. The method of claim 10, wherein the configuration information is stored in a non-volatile data memory.

12. The method of claim 10, wherein a first routine polls for criteria to generate the at least one indication and a run-time routine checks the configuration information.

13. The method of claim 9, wherein the alert standard format operations include watchdog alerts, and wherein watchdog alert operations are not performed when the alert sending device is operating on auxiliary power.

14. The method of claim 9, wherein a disabled alert standard format operation is associated with a timer that is associated with a device that is powered off when a primary power source is off.

15. A network controller, comprising:
at least one sensor for providing a signal indicative of whether at least a portion of the network controller is currently being powered by an auxiliary power source;
at least one data memory for storing alert standard format code associated with a plurality of alert standard format operations; and
at least one processor configured to set, in accordance with the signal, at least one indication in the at least one data memory indicative of whether alert standard format operations are enabled or disabled, and configured to selectively execute a portion of the alert standard format operations based on the at least one indication.

16. The network controller of claim 15, wherein the at least one indication comprises at least one configuration flag that identifies which portion of the alert standard format operations are executed.

17. The network controller of claim 15, wherein the alert standard format operations include watchdog alerts, and wherein the at least one processor does not perform watchdog alert operations when at least a portion of the network controller is operating on auxiliary power.

18. The network controller of claim 15, wherein a disabled alert standard format operation is associated with a timer that is associated with a device that is powered off when a primary power source is off.

19. A network controller, connected to be powered by at least one PCI bus primary power source or a PCI bus auxiliary power source, for performing alert standard format operations when at least a portion of the network controller is powered by the auxiliary power source, the network controller comprising:
at least one sensor for providing a signal indicative of whether at least a portion of the network controller is currently being powered by an auxiliary power source;
at least one data memory, powered by the auxiliary power source, for storing alert standard format code associated with a plurality of alert standard format operations and for storing configuration information; and
at least one processor, powered by the auxiliary power source and coupled to the at least one sensor, for setting, in accordance with the signal, the configuration information, and for selectively executing a portion of the alert standard format operations according to the configuration information.

20. The network controller of claim 19, wherein the configuration information is indicative of disabled alert standard format operations.

21. The network controller of claim 19, wherein the configuration information is indicative of a disabled operation associated with a timer for a device that is powered off when a primary power source is off.

22. An alert sending device comprising:
at least one processor for performing alert standard format operations, wherein the at least one processor selectively executes a portion of the alert standard format operations based on at least one criteria indicative of whether alert standard format operations are enabled or disabled, wherein the alert standard format operations include watchdog alerts, and wherein the at least one processor does not perform watchdog alert operations when the alert sending device is operating on auxiliary power.

23. The alert sending device of claim 22, comprising: at least one sensor for providing a signal to the at least one processor, the signal indicative of whether the alert sensing device is powered by an auxiliary power source, wherein the at least one criteria is whether the alert sending device is operating on auxiliary power.

24. The alert sending device of claim 22, wherein the at least one processor uses at least one configuration flag to determine which alert standard format operations are not executed.

25. A method of performing alert standard format operations, comprising:
retrieving at least one criteria associated with alert standard format operations to be performed by an alert sending device;
identifying enabled portions of the alert standard format operations according to the at least one criteria; and
executing code associated with the enabled portions of the alert standard format operations,
wherein the alert standard format operations include watchdog alerts, and wherein watchdog alert operations are not performed when the alert sending device is operating on auxiliary power.

26. The method of claim 25, comprising:
generating a signal indicative of whether the alert sensing device is powered by an auxiliary power source, wherein the at least one criteria is whether the alert sending device is operating on auxiliary power.

27. The method of claim 25, wherein the at least one criteria comprises at least one configuration flag.

28. A network controller, comprising:
at least one data memory for storing alert standard format code associated with a plurality of alert standard format operations; and at least one processor for selectively executing a portion of the alert standard format operations based on at least one criteria indicative of whether alert standard format operations are enabled or disabled, wherein the alert standard format operations include watchdog alerts, and wherein the at least one processor does not perform watchdog alert operations when the network controller is operating on auxiliary power.

29. The network controller of claim 28, comprising:

at least one sensor for providing a signal to the at least one processor, the signal indicative of whether at least a portion of the network controller is powered by an auxiliary power source, wherein the at least one criteria is whether at least a portion of the network controller is operating on auxiliary power.

30. The network controller of claim 28, wherein the at least one processor uses at least one configuration flag to determine which alert standard format operations are not executed.

* * * * *